(12) United States Patent
Robinson et al.

(10) Patent No.: US 11,722,820 B2
(45) Date of Patent: Aug. 8, 2023

(54) REPRODUCING DIRECTIONALITY OF EXTERNAL SOUND IN AN AUTOMOBILE

(71) Applicant: Tymphany Worldwide Enterprises Limited, Grand Cayman (KY)

(72) Inventors: Matthew Robinson, Grand Cayman (KY); Thomas Pieter J. Peeters, Grand Cayman (KY); Wade Forrest Conklin, Grand Cayman (KY); Rowan Dylan Gower Williams, Grand Cayman (KY)

(73) Assignee: TYMPHANY WORLDWIDE ENTERPRISES LIMITED, Grand Cayman (KY)

(*) Notice: Subject to any disclaimer, the term of this patent is extended or adjusted under 35 U.S.C. 154(b) by 0 days.

(21) Appl. No.: 17/684,176

(22) Filed: Mar. 1, 2022

(65) Prior Publication Data

US 2022/0279276 A1     Sep. 1, 2022

Related U.S. Application Data

(60) Provisional application No. 63/154,989, filed on Mar. 1, 2021.

(51) Int. Cl.
*H04R 3/12* (2006.01)
*G06F 3/16* (2006.01)
(Continued)

(52) U.S. Cl.
CPC .............. *H04R 3/12* (2013.01); *B60K 35/00* (2013.01); *G06F 3/165* (2013.01); *G06V 40/10* (2022.01); *H04R 1/025* (2013.01); *H04R 1/403* (2013.01); *H04R 1/406* (2013.01); *H04R 3/005* (2013.01); *H04R 3/04* (2013.01); *H04S 7/30* (2013.01); *B60K 2370/12* (2019.05);
(Continued)

(58) Field of Classification Search
None
See application file for complete search history.

(56) References Cited

U.S. PATENT DOCUMENTS 8,213,646 B2 * 7/2012 Matsumoto ............... H04S 7/30
    381/310
9,247,370 B2 * 1/2016 Mizuno .................... H04S 3/002
(Continued)

*Primary Examiner* — Paul W Huber
(74) *Attorney, Agent, or Firm* — Muncy, Geissler, Olds & Lowe, P.C.

(57) ABSTRACT

A method for reproducing an external sound in an automobile includes recording external sound using external microphones located on an automobile exterior of the automobile; establishing recorded audio signals based on the recorded external sound; determining from the recorded audio signals a relative directionality of external sound sources of the recorded external sound with respect to at least one occupant within the automobile; establishing at least one directionality encoded audio signal by applying at least one frequency dependent directionality filter to the recorded audio signals, wherein at least one frequency dependent directionality filter is based on the determined relative directionality of external sound sources, thereby encoding the relative directionality into said at least one directionality encoded audio signal; reproducing a representation of the external sound based on at least one directionality encoded audio signal using internal loudspeakers located within an automobile interior of the automobile.

20 Claims, 5 Drawing Sheets

(51) Int. Cl.
*H04R 1/40* (2006.01)
*H04R 3/00* (2006.01)
*H04R 1/02* (2006.01)
*B60K 35/00* (2006.01)
*G06V 40/10* (2022.01)
*H04R 3/04* (2006.01)
*H04S 7/00* (2006.01)

(52) U.S. Cl.
CPC .. *B60K 2370/152* (2019.05); *B60K 2370/157* (2019.05); *B60K 2370/193* (2019.05); *H04R 2201/401* (2013.01); *H04R 2410/07* (2013.01); *H04R 2430/01* (2013.01); *H04R 2499/13* (2013.01); *H04S 2420/01* (2013.01)

(56) References Cited

U.S. PATENT DOCUMENTS

| | | | |
|---|---|---|---|
| 9,397,630 B2 * | 7/2016 | Wang | H03G 9/025 |
| 10,536,791 B2 | 1/2020 | Wacquant et al. | |
| 2013/0223643 A1 * | 8/2013 | Sato | G08G 1/166 |
| | | | 381/86 |

* cited by examiner

| 6 | Audio Processing Unit |
| --- | --- |
| 36 | Microphone Selection Block |
| 37 | Wind Noise Filter |
| 39 | Wind Noise Analysis Block |

REPRODUCING DIRECTIONALITY OF EXTERNAL SOUND IN AN AUTOMOBILE

CROSS REFERENCE TO RELATED APPLICATIONS

The present application claims priority to U.S. Provisional Application Ser. No. 63/154,989, which was filed on Mar. 1, 2021, the entire contents of which are hereby incorporated by reference.

FIELD OF THE INVENTION

The present invention relates to an automobile audio system, to an automobile and to a method for reproducing sound in an automobile.

BACKGROUND OF THE INVENTION

The exterior chassis of automobiles shields the occupants of the automobile from outside weather, noise, drafts, bugs, filth, animals, and undesired intruders. Even though a physical barrier such as the exterior chassis is useful for many purposes, the improved sound proofing of modern cars also hinders listening to an external environment and reduces the possibility of hearing important sounds and importantly also its direction. This lack of directional perception of sound may unfortunately hinder an occupant of an automobile to take appropriate action in response to hearing important sounds, such as, e.g., sirens from nearby ambulances, police cars or firetrucks or similar, and sounds from other road users including pedestrians and cyclists. Unfortunately, this may increase the likelihood of for example traffic accidents. Typically, listening to external sound is permitted by establishing a physical opening in the exterior chassis of the automobile, e.g., by opening windows. However, such an opening may expose occupants of the automobile to weather and external dangers.

U.S. Pat. No. 10,536,791 B2 discloses a vehicular sound processing system including a plurality of interior microphones that detect interior sound emanating from within the interior cabin of the vehicle, and a plurality of exterior microphones that detect exterior sound emanating from exterior the vehicle. The interior microphones also detect exterior sound. A sound processor processes exterior microphone signals to determine exterior sound detected by the exterior microphones. The sound processor processes interior microphone signals to distinguish voices of occupants present within the interior cabin from non-vocal sound emanating from within the interior cabin and from exterior sound emanating from exterior the vehicle. The sound processor processes the exterior microphone signals to determine a sound of interest emanating from exterior of the vehicle. Responsive to determination of the sound of interest, the sound of interest is played by loudspeakers so that a driver of the vehicle can hear the sound of interest.

SUMMARY OF THE INVENTION

The inventors have identified the above-mentioned problems and challenges related to automobiles, and subsequently made the below-described invention, which may provide advantageous automobile audio systems and methods for reproducing sound and perceived sound directionality in automobiles.

As presented by the claims, the invention relates to a method for reproducing an external sound and a perceived directionality of the external sound within an automobile, and further to an automobile audio system, and to an automobile comprising an automobile audio system.

By encoding a relative directionality into an audio signal of a recorded external sound and reproducing a representation of that sound in an automobile based on the encoded relative directionality, the invention advantageously permits occupants to experience a perception of directionality of an external sound, when listening to the representation of that external sound within an automobile. Specifically, the perception of sound directionality enables occupants to sense the direction from which a recorded external sound is emitted simply by listening to a reproduced representation of the external sound in an automobile. The invention thereby advantageously provides a realistic listening experience when listening to reproduced external sounds of, e.g., external people including pedestrians, cyclists, and moped riders, but also when listening to reproduced external sounds that may typically alert occupants of important events. Such alerting sounds could, e.g., comprise sound from nearby road users, sound from sirens, nearby vehicles, automobile horns, the sound of approaching vehicles and bicycle ring bells to name a few.

Encoding a relative directionality into an audio signal of a recorded external sound according to the invention may thus enable a realistic reproduction of that external sound, which due to the encoded relative directionality, may naturally enable occupants listening to the reproduced external sound to take action based on the perceived directionality of an external sound with respect to the occupant.

The perception of sound directionality stems, e.g., from the ability of the brain to determine sound direction based on sound level differences between each ear, and further based on individual differences in frequency and/or phase content of the sound received by each ear. The former may, e.g., be replicated by reproducing sound such that it is emitted towards an occupant from an angle corresponding to the sound source emitting the recorded external sound. On the other hand, the latter may require a directionality dependent filtering of the recorded audio signal to achieve the frequency and/or the phase dependent directionality encoding, to enable replication and/or enhancement of the perceived directionality of, e.g., an external sound when reproducing that external sound.

Encoding a relative directionality into a recorded audio signal may thus comprises changing the frequency and/or the phase content of the recorded audio signal according to the relative directionality of the external sound with respect to an occupant, or an automobile. According to an embodiment of the invention, this may be achieved, for example, by filtering the recorded audio signal and/or by delaying specific recorded audio signals and/or by delaying certain frequencies of the recorded audio signal based on an established relative directionality. Such filtering may be achieved by e.g. frequency dependent directionality filters, which may be based, for example, on one or more head-related transfer functions, according to an embodiment of the invention.

Notice that in the present context, the encoding a relative directionality may also be referred to as directionality encoding. Directionality encoding a recorded audio signal of a recorded external sound and reproducing the external sound in a vehicle, such as an automobile, in general permits a greater utilization of auditory perception when navigating in traffic, which is advantageous. Thus, as a supplement to vision, hearing may be used for navigation in traffic.

THE DRAWINGS

Various embodiments of the invention will in the following be described with reference to the drawings wherein:

FIGS. 8a-c illustrate wind and schematic processing for reduction of wind noise content according to embodiments of the invention.

DETAILED DESCRIPTION

Figure 1:
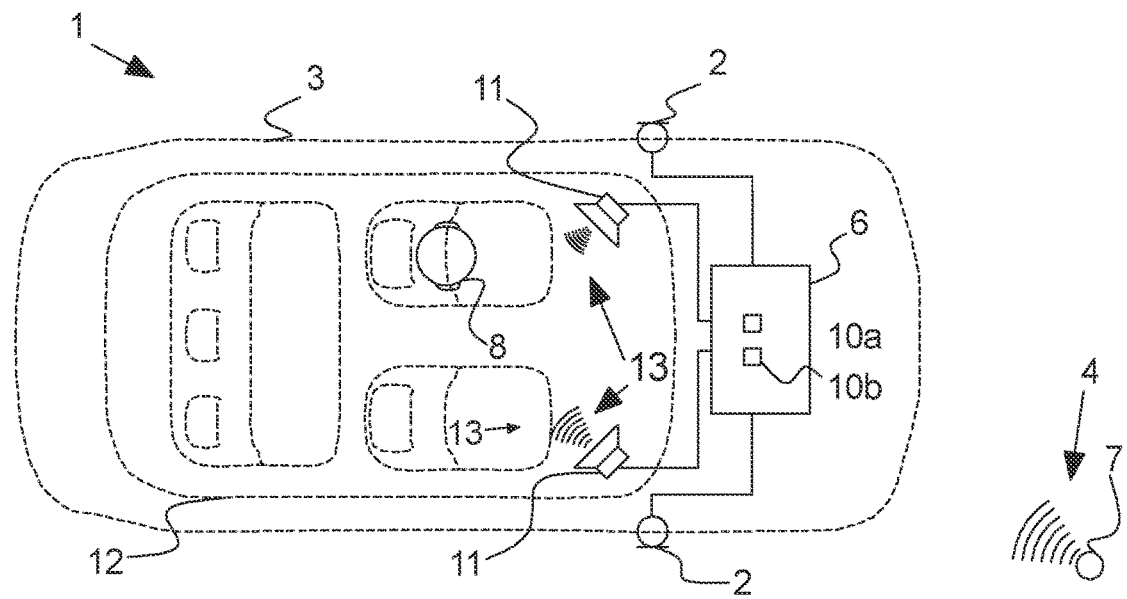
FIG. 1 illustrates an automobile comprising an automobile audio system configured for recording external sound and for reproducing sound directionality based on frequency dependent directionality encoding according to an embodiment of the invention.

In the following, various concepts of the invention are presented without reference to particular embodiments.

An automobile audio system may be understood as an audio system integrated in an automobile, or an audio system intended to be integrated in an automobile. When integrated, an automobile audio system according to embodiments of the invention has a set of loudspeakers integrated/located within the interior of the automobile, i.e., internal loudspeakers. In addition to reproducing external sound, these loudspeakers may be used to reproduce any type of audio as known from conventional automobile audio systems, e.g., radio audio, telecommunication audio, media audio such as music, etc.

Further, when integrated in an automobile, an automobile audio system according to embodiments of the invention has a set of microphones located on the exterior of the automobile, i.e., external microphones. These microphones are not limited to any particular type of microphone but may for example be based on microelectromechanical system (MEMS) technology. Microphones may for example be integrated in suitable cavities of the exterior chassis of the automobile. At least some of the microphones are typically in air communication with the environment outside of the vehicle such that sound does not have to be transmitted through a dampening surface, e.g., a part of the exterior chassis, to be picked up by microphones. However, microphones are not restricted to a particular arrangement and may also be associated with sound dampening means, e.g., windscreens or windshields for microphones.

An automobile audio system according to embodiments of the invention may comprise an audio processing unit configured to facilitate control of communicative coupling between microphones and loudspeakers, and further configured for analyzing and/or processing of recorded audio signals, including encoding a relative directionality into one or more external sound sources of a recorded external sound with respect to at least one occupant within an automobile. Such a unit may for example be implemented as a digital signal processor, an analogue signal processor, as several digital signal processors or as a central processing unit controlling various digital and/or analog signal processors or any other system of one or more digital and/or analogue electronics including controllers. Thus, notice that an automobile audio system is not restricted to a single central unit, as long as it can facilitate communicative coupling and decoupling between the mentioned microphones and loudspeakers, while at the same time facilitating establishing at least one directionality encoded audio signal to reproduce a recorded external sound, including a directionality of that recorded external sound.

Connections, including communicative connections between loudspeakers, microphones, and the audio processing unit may typically be implemented through wired connections, but may in principle also be wireless, e.g., Bluetooth or even Wi-Fi or radio communication. A purpose of the connections between elements of the invention is that audio recorded by a microphone can be transmitted to at least one audio processing unit for establishing at least one directionality encoded audio signal, which may then be transmitted to a loudspeaker for reproduction of the recorded audio signal based on the at least one directionality encoded audio signal. Such reproduction may typically be real-time production but may in principle also be delayed slightly by processing or recorded to be reproduced later.

Notice that according to an embodiment of the invention, the number of the one or more recorded audio signals is equal to or less than the number of said one or more external microphones, and the number of the one or more directionality encoded audio signals may be equal to or less than the number of said one or more internal loudspeakers and/or equal to or less than the number of recorded audio signals, and/or more than the number of recorded audio signals. In other words, the number of directionality encoded audio signals may be independent of the number of recorded audio signals.

A feature according to various embodiments of the invention is that of replicating an external sound within an automobile interior. This may for example be performed based on applying a frequency dependent directionality filter to a recording of the external sound to establish a directionality-encoded audio signal. This signal can then be reproduced by at least a subset of internal loudspeakers to replicate a frequency dependent perceived sound directionality within the automobile. This form of replicating directionality of an external sound within an automobile may be referred to as frequency dependent directionality reproduction. Notice that frequency dependent directionality reproduction may also comprise phase shifting of recorded audio signals or phase shifting particular frequency content within recorded audio signals.

As sound arrives at an occupant, the biometrics of said occupant including, e.g., size and shape of the head, ears, ear canal, density of the head, size and shape of nasal and oral cavities, etc., may transform the sound and affect how it is perceived, boosting some frequencies and attenuating others. Notice that biometrics may further include occupant age, gender, height, weight and other metrics related to an occupant such as, e.g., further anatomical metrics. The relation between an emitted and a perceived sound may be referred to as a head-related transfer function. Because of non-uniform anatomy, such head-related transfer function depends highly on the direction from which the sound is received, which means that sound from different directions have slightly different frequency and/or phase content when reaching the human ear. The human brain unconsciously utilizes these slight differences to determine the direction from which the sound is coming. Deliberately changing these characteristics in sound to be reproduced by a loudspeaker may therefore trick the human brain to perceive the direction differently than the actual direction from the loudspeaker, for example resembling sound coming from behind even though the loudspeaker is in front of the occupant.

By applying one or more frequency dependent directionality filters, e.g., based on the above principle or other techniques to indicate directionality, it is possible to encode a certain directionality into the signal. Accordingly, an occupant may perceive a certain directionality of the reproduction of the external sound. According to an embodiment of the invention, one or more frequency dependent directionality filters may be based on a head-related transfer function. A head-related transfer function may, as described below, e.g., be predefined or determined based on e.g., imaging, biometrics, etc.

The frequency dependent directionality filters may advantageously be determined based on biometrics of an occupant and/or optionally, based on an average of biometrics of a plurality of occupants. Thus, predefined biometrics and/or predefined frequency dependent directionality filters determined based on the biometrics may be stored on the automobile audio system. According to an embodiment of the invention, one or more biometrics may be supplied by a user to the automobile audio system, and/or one or more biometrics may be measured by the automobile audio system.

According to an embodiment of the invention, at least one estimated biometrics of said biometrics of said at least one occupant may be determined based on imaging of said at least one occupant, using one or more from the list of: ultrasonic imaging, optical imaging, camera imaging, infrared camera imaging, voice imaging, fingerprint imaging. Imaging of an occupant may be performed by a camera of any type. The camera may, e.g., be installed in the automobile. Notice that in the present context, voice imaging may, e.g., refer to voice recognition.

Optionally, imaging of an occupant may be applied to identify said occupant and thereby stored data associated with that occupant, including, e.g., estimated biometrics and/or frequency dependent directionality filters. Other data may comprise occupant anatomical parameters, occupant age and gender, etc. Further, estimated biometrics may also refer to predefined estimated biometrics, e.g., based on average estimated biometrics of a number of occupants, and/or alternatively based on a simulated and/or physical model of one or more occupant. The data may advantageously be applied to determine one or more frequency dependent directionality filters and/or head-related transfer functions that may suit the identified occupant and thereby provide an optimal perceived directionality of a reproduced external sound. Determining said filters and/or head-related transfer functions may comprise, for example, selecting filters and/or head-related transfer functions among a set of predefined filters and/or head-related transfer functions. These head-related transfer functions may be based on, for example, a relative directionality with respect to an automobile or alternatively with respect to an occupant. Optionally, head-related transfer functions may further be determined for each ear of an occupant. This is advantageous in that it has the effect of increasing the accuracy with which the perceived directionality of a recorded external sound may be estimated and thereby reproduced, e.g., because it enables establishing a binaural directionality encoding for each ear of, e.g., an occupant in an automobile.

According to various embodiments of the invention one or more generic head-related transfer functions may be established based on one or more head-related transfer functions determined based on a representative occupant, wherein the representative occupant may be based on characteristics of a number of occupants.

Optionally, a profile according to different occupants using the automobile audio system may be stored and recalled by the automobile audio system, when an occupant is using the audio sound system. The profile may advantageously comprise estimated biometrics of the occupant and/or head-related transfer functions and/or predefined frequency dependent directionality filters based on, e.g., biometrics of the occupant. An occupant may, e.g., manually recall a stored profile by interaction with the system, for example by operating a switch, and/or alternatively by operating a graphical user interface configured to control the audio system. In an alternative embodiment of the invention, the system may advantageously automatically recall a profile using face identification using one or more images acquired by the above mentioned types of cameras, e.g., installed in the automobile. For example, an infrared camera may advantageously be applied to image an occupant in, e.g., dark conditions where other types of imaging would not be able to identify an occupant. Automatic recall of profiles may also comprise identifying an occupant based on fingerprint readings of the occupant using a fingerprint sensor installed in the automobile. Optionally, at least one fingerprint sensor may be installed in the steering wheel, so that the profile of an occupant operating the steering wheel may be identified without requiring any further potentially disturbing acts to be performed by the occupant, which is advantageous. However, the fingerprint sensor may also advantageously be installed, for example, in the door handles, and/or in various other places of the automobile that is easily accessible to an occupant occupying or entering an automobile. This may, e.g., be advantageous in relation to passengers that enters the automobile.

Optionally, image recognition of external devices may be applied to identify an occupant, which is advantageous. The external device may then communicate with the automobile audio system and based on the identification of the occupant by the external device, recall data of the occupant, i.e., by recalling the occupant profile on the automobile audio system. External devices may comprise, for example, computing devices such as cell phones, tablets and laptops.

According to various embodiment of the invention, at least one frequency dependent directionality filter may be based on at least one estimated head-related transfer function. Advantageously, this has the effect that at least one frequency dependent directionality filter may be determined based on an estimated head-related transfer function and thereby when filtering a recorded audio signal of an external sound with the filter to establish a directionality encoded audio signal, the relationship between an emitted external sound and a perceived replication of the external sound reproduced within an automobile may be encoded into that reproduced sound. This advantageously enhances the frequency dependent perceived directionality encoded into the recorded audio signal.

In various embodiments, the one or more frequency dependent filters can either generate a mono or a stereo signal or a multichannel signal. These signals may be generated for occupants at an individual level (an individual mono, stereo or multichannel signal for each occupant), or generated collectively for all occupants. The frequency dependent filters can for example depend on the directionality of the external sound and, optionally, on biometrics of one or more occupants. For example, from a lookup table, or from measurements of occupants.

In further embodiments of the invention, replicating directionality when reproducing a recorded external sound within an automobile interior may further comprise emitting sound towards an occupant from specific directions to replicate the physical direction of the recorded external sound. This may be achieved using a plurality of speakers, positioned around the occupant within the automobile. In advantageous embodiments of the invention this way of replicating physical directionality of an external sound within an automobile may advantageously be combined with the above described frequency dependent directionality reproduction of sound to achieve a further enhanced and more accurate perceived directionality of reproduced representation of an external sound within an automobile.

In the present context, an external sound source may refer to any source that may produce sound outside of an exterior of an automobile.

It should be understood that directionality of for example an external sound and/or a relative directionality of an external sound may refer to a directionality of an external sound source producing said external sound, with respect to an occupant or with respect to an automobile. Directionality may be determined in a two-dimensional plane, thus, e.g., including an azimuth directionality, however various embodiments of the invention may further determine a three-dimensional directionality, further taking into account e.g. height and/or e.g. distance to a sound source.

Relative directionality may also comprise predetermined directionality information. For example, in an implementation of the invention, a relative directionality may be determined based on predetermined directionality information of each recorded audio signal based on the microphone locations and/or an analysis of the recorded audio signals.

In the following, various embodiments of the invention are described with reference to the figures.

FIG. 1 illustrates an automobile 1 comprising an automobile audio system configured for recording external sound 4 and for reproducing sound directionality based on frequency dependent directionality encoding according to an embodiment of the invention.

The automobile exterior 3 indicates the outer circumference of the automobile 1, while an automobile interior 12 indicates the size of the cabin of the automobile 1. The cabin may also be understood as the automobile interior, and is here illustrated with seating.

The automobile audio system comprises an audio processing unit 6 comprising two different frequency dependent directionality filters 10a and 10b. The audio processing unit is communicatively connected through wired connection to two external microphones 2, and further connected to two internal loudspeakers 11. The external microphones 2 record an external sound 4 of an external sound source 7 and establishes separate recorded audio signals, which are then separately filtered using the two frequency dependent directionality filters 10a, 10b, to establish two separate directionality encoded audio signals, which are frequency dependent. The internal loudspeakers 2 emit reproductions of the external sound based on the separate directionality encoded audio signals, and thereby reproduce a representation of the external sound 13 within the automobile interior 12 of the automobile 1.

The two frequency dependent directionality filters 10a, 10b are configured to have different filter characteristics in order to encode a different directionality encoding into each of the two recorded audio signals. For example, sound recorded by an external microphone 2 positioned in the right side of the automobile 1 is filtered by a frequency dependent directionality filter such that when the external sound 4 is reproduced by the right internal loudspeaker, the frequency response of the reproduced sound approximates the frequency response that an occupant would have experienced had the occupant 8 been listening to the sound source 7 without a sound insulated exterior of an automobile. Similarly, the sound recorded by the external microphone 2 positioned on the left side of the automobile is filtered by a frequency dependent directionality filter such that when the external sound 4 is reproduced by the left internal loudspeaker, the frequency response of that reproduced sound approximated the frequency response that an occupant would have experienced had the occupant 8 been listening to the sound source 7 without a sound insulated exterior of an automobile. Thus, when both internal speakers 2 act in concert to playback each of the two directionality encoded audio signals, a representation of said external sound 13 is reproduced within the automobile 1. Thereby, advantageously enhancing the occupants perceived directionality of the recorded external sound.

The frequency dependent directionality filters 10a, 10b may be of various types including, e.g., finite impulse response (FIR) filters and/or infinite impulse response (IIR) filters and they may have varying order. Optionally, other types of filters may also be applied, and further optionally, a series of filters may be applied to the recorded audio signal. The filters may be arranged sequentially or in parallel. The frequency dependent directionality filters may be fixed generic filters determined based on a directionality with respect to an occupant 8 within the automobile or optionally with respect to the automobile 1. When filtering the recorded audio signals using such fixed generic filter, the filter encodes a fixed frequency dependent directionality into said recorded audio signals. For example, applying the filter connected to the left microphone may induce a directionality encoding into that recorded audio signal established by that left microphone such that when that particular recorded external sound is reproduced inside an automobile, the occupant 8 may perceive the sound as coming from the left side of the car. Similarly, applying the filter connected to the right microphone may induce a directionality encoding into that recorded audio signal established by that right microphone such that when that particular recorded external sound is reproduced inside an automobile, the occupant 8 may perceive the sound as coming from the right side of the car.

Optionally, individual frequency dependent directionality filters may be determined based on a relative directionality with respect to individual occupants 8 and/or individual occupant locations within the automobile. Thus, when more than one occupant is positioned in the automobile 1, one or more directionality filters may be determined for each of the occupants, based on the individual position and/or location of each of the occupants within the automobile. Advantageously, replication of an external sound in the automobile may thus be tailored to specific occupants and/or occupant locations within the automobile.

Optionally an occupant location may be determined based on a sensor in a chair, thereby recognizing that an occupant is sitting in the chair. Occupant location may also be based on biometric imaging as described below and above and/or be based on data recalled on the audio system, e.g., data stored in relation to a profile of an occupant as presciously described.

Optionally additional microphones may be applied and positioned to measure external sound in further directions. For example, one additional external microphone positioned and configured to measure external sound in front of the automobile and one additional external microphone positioned and configured to measure external sound from external sound sources behind the automobile 1. The microphones may be connected to additional frequency dependent directionality filters adapted to these microphone positions to advantageously enhance the perceived directionality experienced by occupants listening to the reproduced representation of external sound within the automobile 1.

Optionally, the audio processing unit 6, e.g., a digital signal processor, may be implemented and configured to receive the recorded audio signals from the external microphones 2 and to analyze these signals, to, e.g., determine the relative direction of the external sound source 7 and adapt the frequency dependent directionality filters according to the determined relative direction of the external sound source. This may advantageously improve the accuracy with which a relative directionality is determined.

In an exemplified implementation, the audio processing unit may determine directionality of an external sound source 7 based on level difference between recorded audio signals acquired using at least two different microphones. In a simple implementation, the relative directionality of the external sound is determined as the direction of the external microphone providing a recorded audio signal with the highest level. Notice that level may be measured in various way, e.g., as sound pressure level (SPL), loudness, intensity, etc. The level may be measured within one or more frequency bands, e.g., within the audible frequency band or, e.g., frequency bands of particular relevant sound categories. Such sound categories may comprise, e.g., sirens, speech, nearby automobile sound, sound of bicycle ring bells etc.

Optionally, representation of the recorded external sound may be played loudest and/or only through a subset of the internal loudspeakers 11 positioned in the same side as the microphone that provided the highest recorded audio signal to also replicate a physical directionality of the recorded external sound, which is advantageous.

Optionally, the audio processing unit may be configured to determine directionality of an external sound source based on analysis of at least two recorded audio signals recorded by two internal microphones positioned at different locations on the automobile. Given the different positions of the microphones, the two recorded audio signals established by the microphones will have a different frequency response and thereby different frequency content and phase content depending on the microphone locations. Thus, a directionality of an external sound may be determined based on these frequency and phased differences of the at least two recorded audio signals and based on knowledge of the position of each of the external microphones that recorded the at least two different recorded audio signals.

Figure 2:
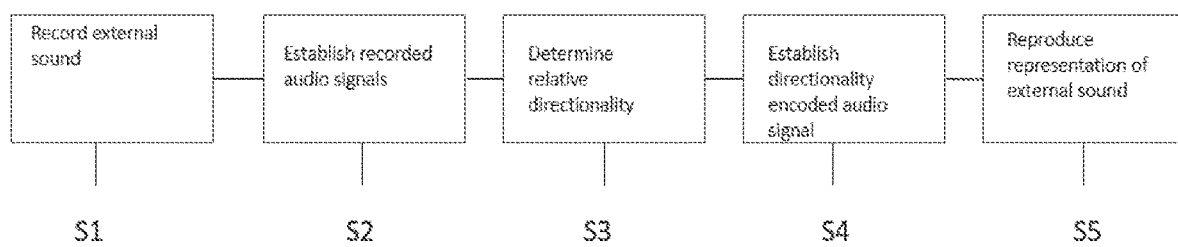
FIG. 2 illustrates method steps for reproducing an external sound in an automobile according to an embodiment of the invention.

FIG. 2 illustrates method steps S1-S5 for reproducing an external sound in an automobile according to an embodiment of the invention.

In a first step S1 of the method, an external sound 4 is recorded using at least on of one or more external microphones located on an automobile exterior of an automobile.

In a next step S2 of the method, one or more recorded audio signals are established based on the recorded external sound.

In a further step S3 of the method, a relative directionality of one or more external sound sources of the recorded external sound with respect to at least one occupant within said automobile is determined from the one or more recorded audio signals.

In a next step S4 of the method, at least one directionality encoded audio signal is established by applying at least one frequency dependent directionality filter to the one or more recorded audio signals, wherein the at least one frequency dependent directionality filter is based on the determined relative directionality of the one or more external sound sources, thereby encoding the relative directionality into the at least one directionality encoded audio signal.

In a final step S5 of the method, a representation of the external sound is reproduced based on the at least one directionality encoded audio signal using one or more internal loudspeakers located within an automobile interior of the automobile.

The method steps according to the invention may be performed in any order, and thus the method is not limited to the exemplified ordering of method steps described above.

Figure 3:
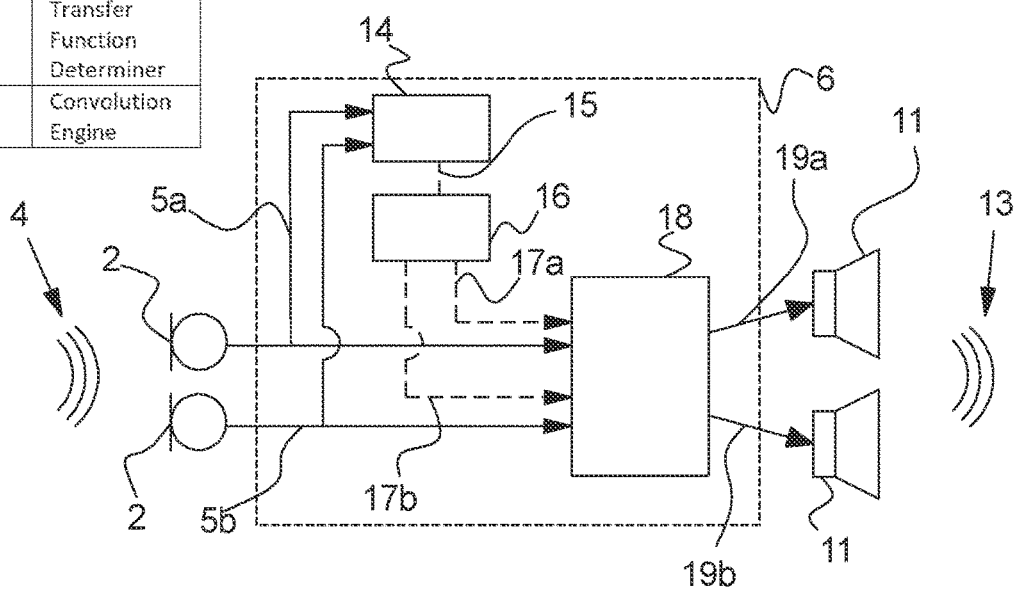
FIG. 3 illustrates a schematic view of an exemplary automobile audio system.

FIG. 3 illustrates a schematic view of an exemplary automobile audio system comprising an audio processing unit 6 configured for directionality-encoding recorded audio signals 5 of an external sound 4, and for reproducing the external sound based on the directionality encoded audio signals, according to an embodiment of the invention.

The automobile audio system comprises two external microphones 2, two internal loudspeakers 11, and an audio processing unit. The two external microphones 2 record the external sound 4 and a recorded audio signal 5a, 5b is established for each microphone. Since the microphones have different locations, the two audio signals 5a, 5b are typically slightly different from each other. For example, the amplitudes of the recorded audio signals differ and/or the frequency content of the recorded audio signal differ, and/or one recorded audio signal is delayed/phase shifted in comparison with the other audio signal.

The audio processing unit comprises an audio signal analyzer 14 which receives the two recorded audio signals 5a, 5b. Based on an analysis of the received audio signals, the audio signal analyzer 14 determines a directionality of an external sound source of the external sound 4. In this embodiment, the audio signal analyzer employs principles of beamforming (as introduced elsewhere in this disclosure) to determine the directionality. In alternative embodiments, level differences, e.g. amplitude differences, are analyzed to determine the directionality.

When the directionality has been determined by the audio signal analyzer 14, the audio signal analyzer 14 forwards a relative directionality information signal 15 to a head related transfer function determiner 16. The relative directionality information signal 15 is indicative of a relative angle at which the external sound 4 arrives at the automobile/automobile audio system and/or arrives at an occupant inside the vehicle. The head related transfer function determiner 16 outputs two head related transfer function impulse responses 17a, 17b for each loudspeaker 11, based on the relative directionality information signal 15, which in turn are forwarded to separate convolution engines 18 at which separate frequency dependent directionality filters are applied to the recorded audio signals. The frequency dependent directionality filters each depend on the received head related transfer function impulse responses 17a, 17b, such that the frequency dependent directionality filters are based on the relative directionality of the external sound source, which in turn is determined by the audio signal analyzer 14.

The frequency dependent directionality filters are respectively applied to the two recorded audio signals 5a, 5b. Two directionality-encoded audio signals 19a, 19b, one for each loudspeaker, are generated and supplied to two loudspeakers 11. Each directionality-encoded audio signals for reproduction by a loudspeaker may thereby include audio from one or, preferably, all of the microphones. Accordingly, a representation of the external sound 13 is reproduced based on the directionality-encoded audio signals 19a, 19b using the internal loudspeakers 11. Accordingly, an enhanced sense of directionality of the external sound 4 may be provided to an occupant in an automobile.

In this exemplary embodiment, the two microphones 2 are located to the right-hand side and the left-hand side of the automobile, respectively. Similarly, the two loudspeakers 11 are internally located to the right-hand side and the left-hand side of the automobile, respectively. The directionality encoded audio signal based on the recorded audio signal of the left-hand side microphone is supplied to the left-hand side loudspeaker, and the directionality encoded audio signal based on the recorded audio signal of the right-hand side microphone is supplied to the right-hand side loudspeaker.

If, for example, the directionality of the external sound source is determined to be to a right-hand side of the automobile, the frequency dependent directionality filters 10a, 10b are automatically selected to correspond to a sound source corresponding to the right-hand side of the occupant, e.g., by boosting one or more frequency bands and/or attenuating one or more other frequency bands. Consequently, the external sound is not only reproduced by one or more of the two loudspeakers, but additionally, the frequency dependent directionality filters have encoded an analyzed directionality onto the representation of the external sound 13, such that an occupant listening to the reproduced representation of the external sound 13 experiences a clearer perceived directionality.

In some embodiments of the invention, the audio signal analyzer 14 is configured to distinguish two or more external sounds 4 recorded by the microphones 2 to provide two or more directionalities and associated relative directionality information signals. Accordingly, the audio processing unit may apply several sets of frequency dependent directionality filters, e.g., one set for each external sound. These sets of frequency dependent directionality filters are then applied to the recorded audio signals, or to separate parts of the recorded audio filters corresponding to the separate external sounds. Accordingly, an occupant may receive several representations of several respective external sounds, each representation being established via a different set of filters.

Figure 4:
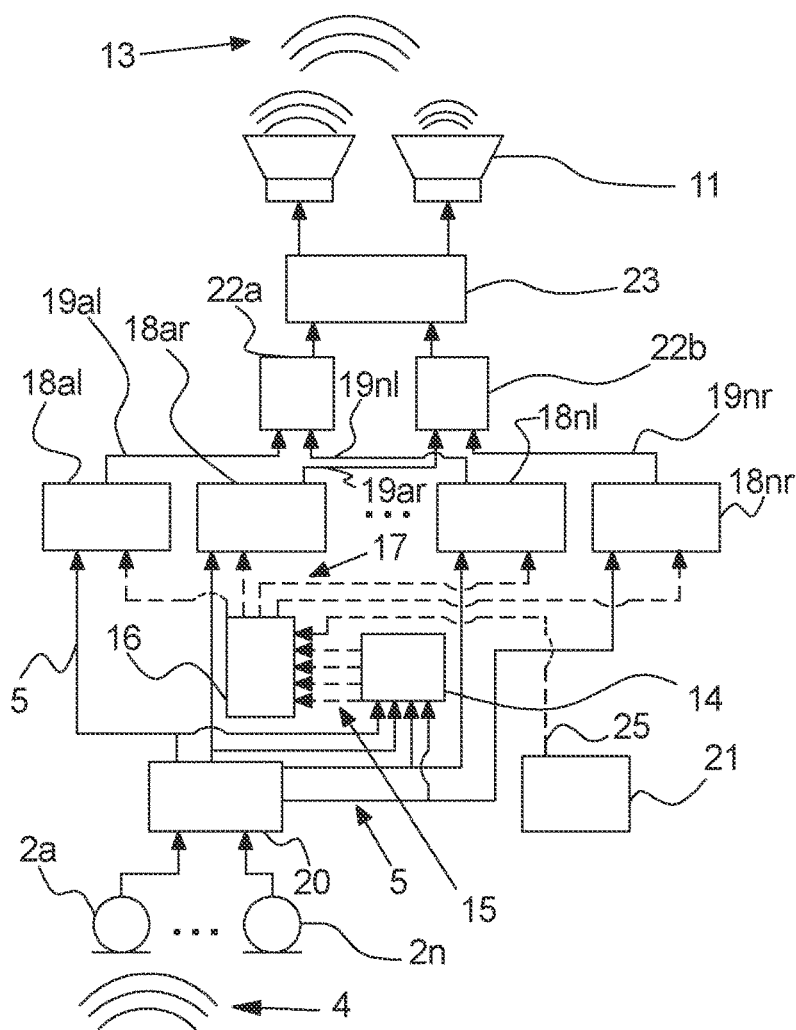
FIG. 4 illustrates, schematically, exemplary recording of an external sound and directionality encoding the external sound to each individual ear of an occupant within an automobile.

FIG. 4 illustrates, schematically, exemplary recording of an external sound 4 and directionality encoding the external sound to each individual ear of an occupant within an automobile, according to an embodiment of the invention.

The automobile audio system comprises a set of external microphones 2a, . . . , 2n, e.g., eight microphones configured to be located around the exterior of an automobile. Further, the embodiment comprises 2 internal loudspeakers 11, although other embodiments comprise more than two loudspeakers, for example two loudspeakers per occupant and/or occupant location (e.g., car seat) in the automobile, or even more than two loudspeakers per occupant location.

The embodiment comprises similar features to the embodiment illustrated in FIG. 3. That is, external sound 4 is recorded by the microphones 2a, . . . , 2n to generate recorded audio signals 5 which are provided to an audio signal analyzer 14. The audio signal analyzer 14 determines a directionality of the external sound to generate at least one relative directionality information signal 15 which in turn is supplied to a head related transfer function determiner 16. Here, head related transfer function impulse responses 17 are outputted to convolution engines 18a1,18ar,18nl,18nr, in which frequency dependent directionality filters are applied to the recorded audio signals 5 to establish directionality encoded audio signals 19al,19ar, 19nl,19nr. Eventually, a representation of the external sound 13 is reproduced by the internal loudspeakers 11 based on the directionality encoded audio signals 19al,19ar,19nl,19nr.

Additionally, this embodiment comprises an audio input analog to digital converter 20, which convert the analog signals recorded by the microphones 2a, . . . , 2n into digital signals on which further analysis and processing is based. Prior to supplying signals to the internal loudspeakers 11, an audio output digital to analog converter 23 reconverts the processed digital signals into analog signals suitable for the loudspeakers 11. This embodiment, as well as other embodiments, may optionally include audio amplifiers, e.g., located before to the loudspeakers, such that the loudspeakers receive an amplified audio signal.

Furthermore, the illustrated embodiment comprises a biometrics information unit 21, which supplies a biometric information signal 25 to the head related transfer function determiner 16. The head related transfer function impulse response 17 (and the corresponding frequency dependent directionality filter) consequently depends both on the relative directionality information signal 15 and the biometric information signal 25.

The biometrics information unit 21 and its outputted information signal 25 comprises digital information of an occupant, the information being indicative of biometrics of that occupant of relevance for determining an accurate head related transfer function. Thus, the biometrics may comprise estimated biometrics. In this embodiment, the biometrics information is height and gender of an occupant, which the occupant has supplied to the audio processing unit. However, in other embodiments, the biometrics information may further be partly or fully automatically measured and/or estimated by the automobile audio system, and/or may relate to other/additional biometrics.

Optionally, an identification system may be applied to identify an occupant and thereby recall relevant stored estimated biometrics and/or predefined estimated biometrics of the identified occupant, which may be outputted as an output information signal 25 by the biometrics information unit 21. Such identification system may utilize various kinds of imaging to identify an occupant. As previously described such imaging may comprise, e.g., camera imaging, ultrasonic imaging, fingerprint imaging, voice imaging, infrared imaging to name a few.

Optionally, imaging may be built into the audio system to enable direct estimation of biometrics of an occupant in the automobile. Examples of such direct estimation may comprise, e.g., body surface rendering including determining head shape and/or size, facial features etc.

Optionally, estimated biometrics may be applied to obtain other estimated biometrics, e.g., facial features acquired by imaging may be applied, for example, to identify occupant age, weight, height. For example, identifying an estimated occupant age may advantageously, e.g., enable determining a head-related transfer function according to age-dependent auditory changes, and thereby improve the perceived directionality of a reproduced external sound experienced by the occupant. Notice that the head-related transfer function may include volume adjustment, e.g. according to, e.g., estimated biometrics an occupant. For example, the mentioned age dependent auditory changes may be accounted for by volume adjustments when reproducing an external sound.

Optionally, determining biometrics may comprise adjusting estimated biometrics according to a position of a seat that an occupant is sitting in. For example, when a height of an occupant is applied to determine a head-related transfer function for an occupant, the height of the occupant may be adjusted according to the position of the seat, e.g., based on one or more sensors positioned to determine the position of the seat.

This embodiment further comprises several pairs of convolution engines 18*al*,18*ar*,18*nl*,18*nr*. A pair of convolution engines 18*al*,18*ar* process an external sound to establish a pair of directionality encoded audio signals 19*al*,19*ar*, which, via filters, have been encoded with the directionality of that external sound.

In case of multiple external sounds with different directionalities, each pair of convolution engines 18*al*,18*ar*,18*nl*,18*nr* treats an individual external sound to establish directionality encoded audio signals encoded with the directionality of that external sound. Accordingly, multiple external sounds are encoded with individual directionalities.

The directionality encoded audio signals 19*al*,19*nl*, which are intended to the left ear of an occupant are supplied to one ear specific audio engine 22*a*, and the directionality encoded audio signals 19*ar*,19*nr* which are intended to the right ear of the occupant are supplied to another ear specific audio engine 22*b*. These engines 22*a*, 22*b* superimpose received signals, such that they may be supplied simultaneously to an occupant. Finally, output signals are converted by the digital to analog converter 23 and supplied to the internal loudspeakers 11.

In this embodiment, each of the two loudspeakers 11 are intended to primarily supply sound to each of two ears of an occupant, respectively. The loudspeakers may for example be located in a headrest in the automobile intended for the occupant. However, in other embodiments, loudspeakers are distributed around the interior of the car, with no clear intention of loudspeakers for specific ears of occupants.

In other embodiments, the automobile audio system performs the processing and reproduction of external sound as illustrated in FIG. 4 for each of the occupants. For example, a biometric information signal is supplied for each of the occupants, directionality encoded audio signals are established for each of the occupants, and a representation of one or more external sounds is reproduced by loudspeakers for each of the occupants. For example, each individual occupant may receive personalized audio, e.g., via beamforming or personal loudspeakers, such as loudspeakers in the headrest.

Figure 5:
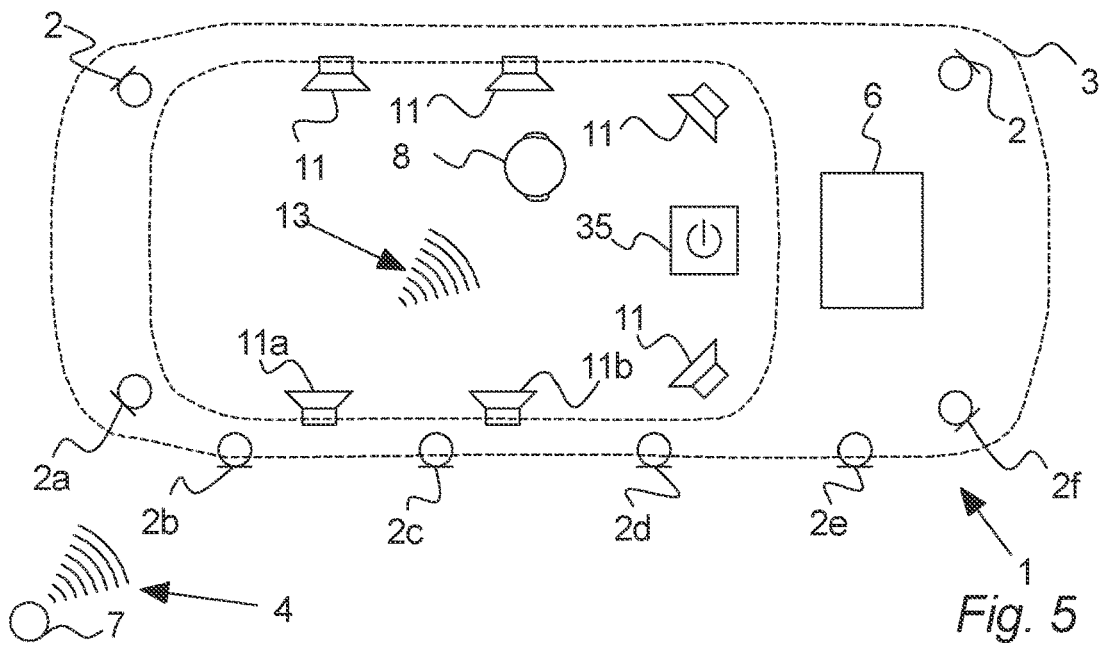
FIG. 5 illustrates recording external sound and reproducing sound directionality based on beamforming according to an embodiment of the invention.

FIG. 5 illustrates recording external sound 4 and reproducing sound directionality within an automobile 1 based on beamforming according to an embodiment of the invention.

As in FIG. 1, the automobile exterior 3 indicates the outer circumference of the automobile 1, while the automobile interior 12 indicates the size of the cabin of the automobile 1, which may also be understood as the automobile interior.

For simplicity, communicative connections between the external microphones 2, the audio processing unit 6, and the internal loudspeakers 2 are not shown.

The embodiment illustrated in FIG. 5 has several elements in common with the embodiment illustrated in FIG. 1. In addition, the embodiment illustrated in FIG. 5 has an audio processing unit 6 configured to analyze recorded audio signals to determining a relative direction of an external sound source 7 with respect to an occupant, and further configured for audio processing, the present embodiment further comprise additional external microphones 2, the microphones record external sound 4, and the loudspeakers 2 emit a representation of external sound 13 based on the external sound 4. Furthermore, the directionality of the external sound is replicated by the representation of external sound 13. Also, the embodiment features a transmission switching mechanism, which may, e.g., enable an occupant to manually switch on and/or switch of reproduction of external sound in an automobile and/or switch on/or switch off an automatic operation mode, wherein the switching on and/or switching off the reproduction of an external sound in an automobile is automatically determined e.g. based on an importance of an external sound. An external sound may, e.g., be deemed "not important" or "important." For example, background noise such as, e.g., wind noise, and tire noise may be deemed 'not important' and thereby may not be reproduced, whereas sounds such as, e.g., sirens, automobile horn sound, sound of nearby automobiles and/or other nearby road users and/or pedestrians and cyclists may be deemed "important" and, therefore, may be reproduced. The automobile audio system of an automobile may also simply be configured to automatically switch on when the automobile is turned on, and turned off when the automobile is turned off, and/or turned off, when the signal to noise ratio exceeds a threshold, e.g., due to high amounts of wind noise, which may e.g. occur when e.g. driving the automobile at high speed.

In the schematic illustration, the external sound 4 stems from an external sound source 7 in a lower left-hand side direction. Since the embodiment comprises an array of microphones 2*a*-2*f*, beamforming is utilized to obtain a sound directionality relative to said automobile 1 and/or said occupant 8.

Beamforming is a signal processing technique, in which sensor arrays (e.g., microphones) can be utilized for directional signal reception. The relative phase and amplitude recorded by the individual microphones can be used to pinpoint a directionality. In simple terms, when the distance from each microphone and the sound source is different, the sound will arrive at different times to the different microphones. This time difference can be used to infer a direction, or even a position, of the source.

In the illustrated embodiment, the external sound arrives at microphone 2*b* first, then microphone 2*a*, then microphone 2*c*, then microphone 2*d* etc. The resulting audio signals from the individual microphones are processed in the audio processing unit 6, which analyze theses audio signals through a beamforming algorithm in which relative phases and amplitudes are compared while taking the microphone locations into account. Since the external sound arrives at microphone 2*b*, then microphone 2*a*, then microphone 2*d*, an approximate directionality can be estimated. By considering the exact timing between arrival of the external sound, the directionality can be estimated more precisely.

Generally, embodiments of the invention are not restricted to a particular type of beamforming analysis or algorithm, and any type may be utilized.

Based on the beamforming algorithm, a directionality of the external sound 4 is thus obtained. This directionality is replicated in the reproduction of the representation of the external sound 13 by the internal loudspeakers 11.

In this embodiment, the internal loudspeakers 11 utilize beamforming to replicate the directionality. Since some of the internal loudspeakers 11*a* and 11*b* form an array, beamforming can be used for directional signal transmission. An array may be understood as more than two loudspeakers. Many of the same principles as for directional signal reception apply, but the process is be reversed, e.g., a relative phase and amplitude has to be encoded onto the individual audio signals which are provided to the individual loudspeakers. Consequently, the emitted audio signals from the loudspeakers interfere, and as a result of this interference, the directionality of the reproduction of representation of the external sound 13 replicates the directionality of the external sound 4.

Again, embodiments of the invention are not restricted to a particular type of beamforming analysis or algorithm.

In an alternative embodiment, the replication may for example be performed based on only reproducing the sound in a subset of the loudspeakers, e.g., loudspeaker 11a.

In another embodiment, the replication may be performed using directional reproduction of sound guided to one side of an occupant, e.g. using loudspeaker pairs as described in this disclosure.

Figure 6:
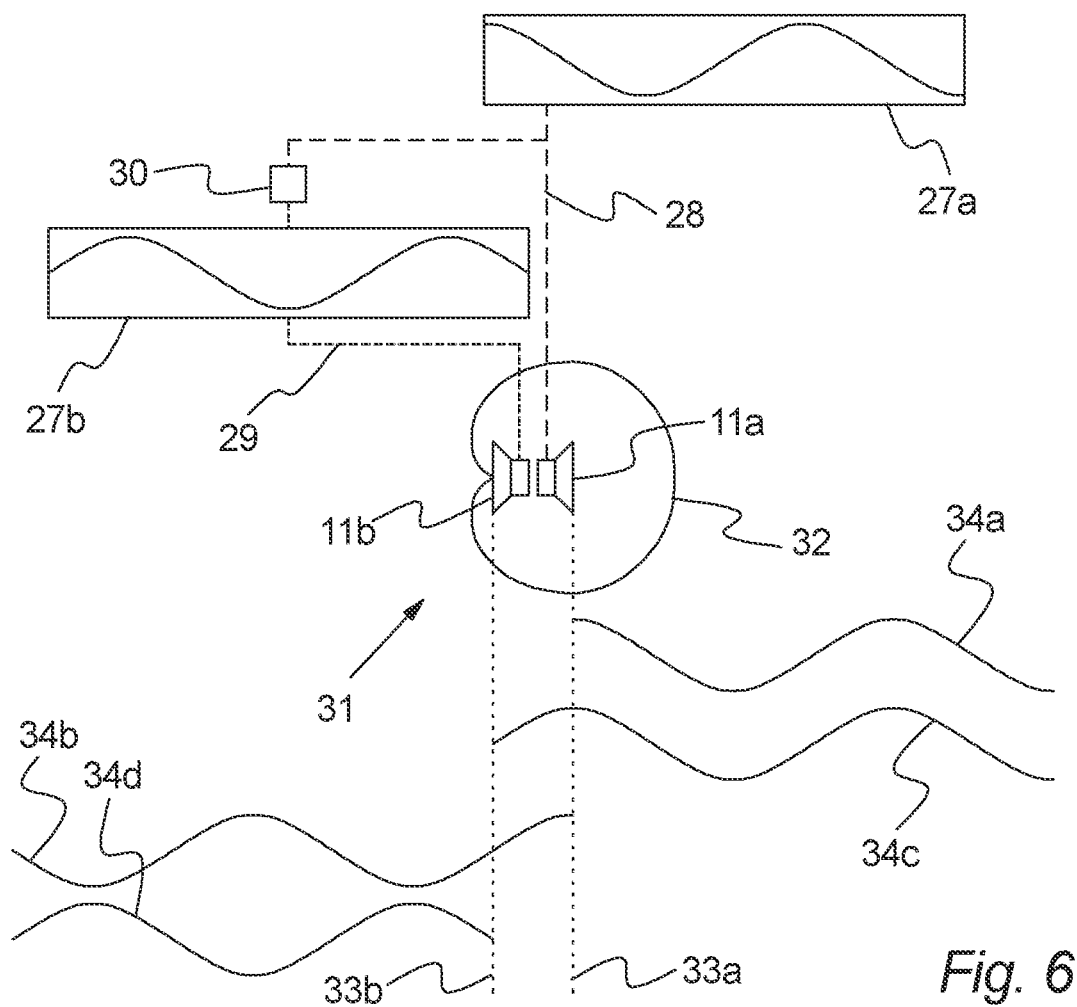
FIG. 6 illustrates exemplary generation of a directional reproduction of sound using loudspeaker pairs according to an embodiment of the invention.

FIG. 6 illustrates exemplary generation of a directional reproduction of sound 32 using loudspeaker pairs according to an embodiment of the invention.

The schematic illustration may be viewed in contrast to reproduction of sound from a single loudspeaker. When a single loudspeaker reproduces an audio signal, it may generate an approximately isotropic reproduction of sound.

In FIG. 6, a loudspeaker pair 31 receives both a principal signal 28 and an accommodating signal 29, which is based on the same audio content. The principal signal 28 has an associated audio signal representation 27a, which display the audio signal value as a function of time in a limited time window. In this exemplary illustration, it resembles a sinusoidal curve. The principal signal is divided into two signal paths: one which transmits the signal directly to a forward loudspeaker 11, and another which feeds the signal to a delay 30. The delay results in the establishment of an accommodating signal 29 and corresponds to a quarter of a period of the sinusoidal signal. Accordingly, the accommodating signal 29 has an associated audio signal representation 27b, which displays how the accommodating signal 29 is delayed compared to the principal signal 28 and its representation 27a. The delay further corresponds to a phase shift between the principal signal 28 and the accommodating signal 29. The accommodating signal 29 is supplied to the backward loudspeaker 11b of the pair of loudspeakers 31.

Thus, the forward loudspeaker 11a receives a principal signal 28, and the backward loudspeaker 11b receives an accommodating signal 29. Each of the internal loudspeakers 11a, 11b reproduce its received signal as sound represented by sound propagation signals 34a, 34b, 34c, 34d propagating in both directions relative to loudspeaker propagation points 33a, 33b of the two respective loudspeakers 11a, 11b. Thus, the horizontal direction of FIG. 6 may again be interpreted as a spatial axis on which the loudspeakers are located, such that sound may propagate in both directions of this axis. There is a distance between the two loudspeaker propagation points 33a, 33b. To generate a directional reproduction of sound 32, e.g., towards an occupant (not shown), it is typically necessary to match signal processing with this distance.

The forward loudspeaker 11a symmetrically emits a sound propagation signal 34a to the right-hand side and another sound propagation signal 34b to the left-hand side relative to a loudspeaker propagation point 33a. The two signals 34a, 34b are mirrored due to opposite propagation directions. In a similar manner, the backward loudspeaker 11b symmetrically emits a sound propagation signal 34c to the right-hand side and another sound propagation signal 34d to the left-hand side relative to a loudspeaker propagation point 33b.

If only considering the sound radiation from one of the two loudspeakers, an isotropic reproduction of sound is obtained; at least in this simple model of radiation.

However, for the loudspeaker pair 31, interference has to be taken into account. The resulting directional reproduction of sound 32 is thus based on a superposition of the individual contributions of sound propagation signals 34a, 34b, 34c, 34d. To the right-hand side, a sound propagation signal 34a of the forward loudspeaker 11a and a sound propagation signal 34c of the backward loudspeaker 4b interfere constructively. In contrast, to the left-hand side, a sound propagation signal 34b of the forward loudspeaker 11a and a sound propagation signal 34b of the backward loudspeaker 11b interfere destructively. Destructive interference to the left-hand side and constructive interference to the right-hand side result in a directional reproduction of sound 32.

Reproduction of sound from a loudspeaker pair may for example be considered directional if substantially more radiation is emitted in one direction in comparison with in one other direction, e.g., an opposite direction. In this particular illustration, the directional reproduction of sound 32 is illustrated as a cardioid radiation pattern, radiating from the center of the loudspeaker pair 31. However, embodiments of the invention are not restricted to a particular distribution of radiation.

In the exemplary illustration, the directional reproduction of sound 32 has a propagation direction to the right-hand side, its intensity to the right-hand side is larger than to its left-hand side, and an integration of the intensity to the right-hand side is larger than an integration of the intensity to the left-hand side.

Thus, an approach to generate a directional reproduction of sound has been outlined. This approach may be employed for implementation of the invention, for example for providing individualized sound to individual occupants of an automobile, including generating sound directionality in the reproduction of external sound within an automobile.

However, other approaches for generating a directional reproduction of sound may also be employed according to the invention, within the scope of the claims. Particularly, more detailed processing is required for generating a directional reproduction of sound across a broad range of frequencies, e.g., a frequency dependent delay or phase shift.

Figure 7:
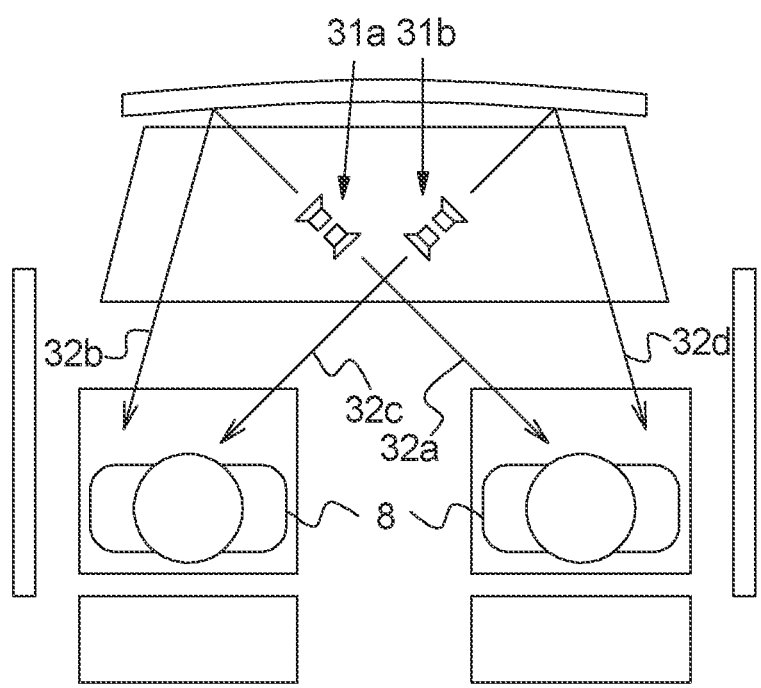
FIG. 7 illustrates exemplary guiding of directional reproduction of sound to individual occupants according to an embodiment of the invention.

FIG. 7 illustrates exemplary guiding of directional reproduction of sound 32a-d to individual occupants 8 according to an embodiment of the invention. Such direction reproduction may for example be implemented using loudspeaker pairs as introduced in relation to FIG. 6.

In this embodiment, the two loudspeaker pairs 31a, 31b of FIG. 7 are each be integrated into the dashboard of an automobile. Optionally, wave guides may also be integrated in the dashboard to ensure that the sound from the loudspeakers are guided outward from the dashboard.

Each of the two loudspeaker pairs 31a, 31b are arranged to generate two directional reproductions of sound 32a, 32b, 32c, 32d, which in FIG. 7 are illustrated as arrows, for simplicity. The arrows may for example be interpreted as a propagation direction.

The first loudspeaker pair 31a receives one principal signal and one accommodating signal based on one audio signal to generate one directional reproduction of sound 32a. Further, the first loudspeaker pair received another accommodating signal and another principal signal based on another audio signal to generate another direction reproduction of sound 32*b*, with an opposite propagation direction. Resultingly, the loudspeaker pair 31*a* can generate two directional reproductions of sound 32*a*, 32*b* simultaneously.

Similarly, the second loudspeaker pair can simultaneously generate two other directional reproductions of sound 32*c*, 32*d*.

The first loudspeaker pair 31*a* thus generates a first forward directional reproduction of sound 32*a* and a first backward directional reproduction of sound 32*b*. These are initially guided slightly upwards by waveguides. Subsequent to any initial guiding, the first forward directional reproduction of sound 32*a* arrives to a right-hand side occupant 8. The first backward directional reproduction of sound 32*b* arrives at the windscreen of the automobile which acts as a sound reflection surface to reflect this directional reproduction of sound 32*b* towards a left-hand side occupant 8.

In a similar manner, the second loudspeaker pair 31*b* generates a second forward directional reproduction of sound 32*c* and a second backward directional reproduction of sound 32*d*. These are initially guided slightly upwards by waveguides. And subsequent to any initial guiding, the second forward directional reproduction of sound 32*c* arrives to the left-hand side occupant 8. The second backward directional reproduction of sound 32*d* arrives at the windscreen which again acts as a sound reflection surface to reflect this directional reproduction of sound 32*d* towards the right-hand side occupant 8.

As a result of the directional reproduction of sound, each of the two occupants receives two separate audio signals. As indicated in FIG. 7, these two audio signals may even primarily arrive to in different regions, e.g., different sides, of the occupants. That is, for the right-hand side occupant 8, the first forward directional reproduction of sound 32*a* arrives at the left-hand side of that occupant 8, and the second backward directional reproduction of sound 32*d* arrives at the right-hand side of that occupant 8.

In this way, the two occupants 8 in the two occupant locations may each for example receive personalized stereo audio.

FIG. 7 illustrates one example of guiding directional reproduction of sound to occupants and/or occupant locations. In other embodiments, radiation may for example be guided using further reflections, e.g., on the headliner of the automobile, on side windows, on rear windows, on glass panel roofs or a surface dedicated for reflection. Radiation may further be guided using any type of waveguide. Additionally, embodiments of the invention do not necessarily include use of a sound reflection surface.

Loudspeaker pairs may be located in any location of an automobile, e.g., integrated in car doors, car seats, or other parts of the interior of the car.

Personalized audio may further be guided to any occupant location, e.g., backseats in an automobile.

Personalized audio enables reproduction of external sound to individual occupants in a vehicle, which is advantageous. In some embodiments, several occupants may each have a personal transmission switching mechanism, which control coupling of external microphones with a different subset of internal loudspeakers which provide personalized audio for an occupant associated with that personal transmission switching mechanisms. As a result, each individual occupant may control whether external sound is reproduced for that occupant while minimizing sound near other occupants, which is advantageous.

Personal audio as exemplified in the present embodiment may in various embodiments of the invention be generated based on directionality encoded audio signals, to reproduce a representation of an external sound based on at least one directionality encoded audio signal, which is advantageous.

Personalized audio may further be used for providing an external sound cancellation signal for individual occupants using principles of conventional active noise control. For example, if one occupant has enabled coupling via a personal transmission switching mechanism such that a reproduction of a representation of external sound is provided to that occupant, another occupant may, optionally, receive an external sound cancellation signal for cancelling the (reproduction of) of external sound. Thus, when such a cancellation system is enabled, one occupant's desire to listen to external sound may minimally influence external sound perceived by other occupants, which is advantageous.

Alternatively, personalized audio may be provided using one or more loudspeaker arrays, e.g., utilizing principles of beamforming.

Figure 8B:
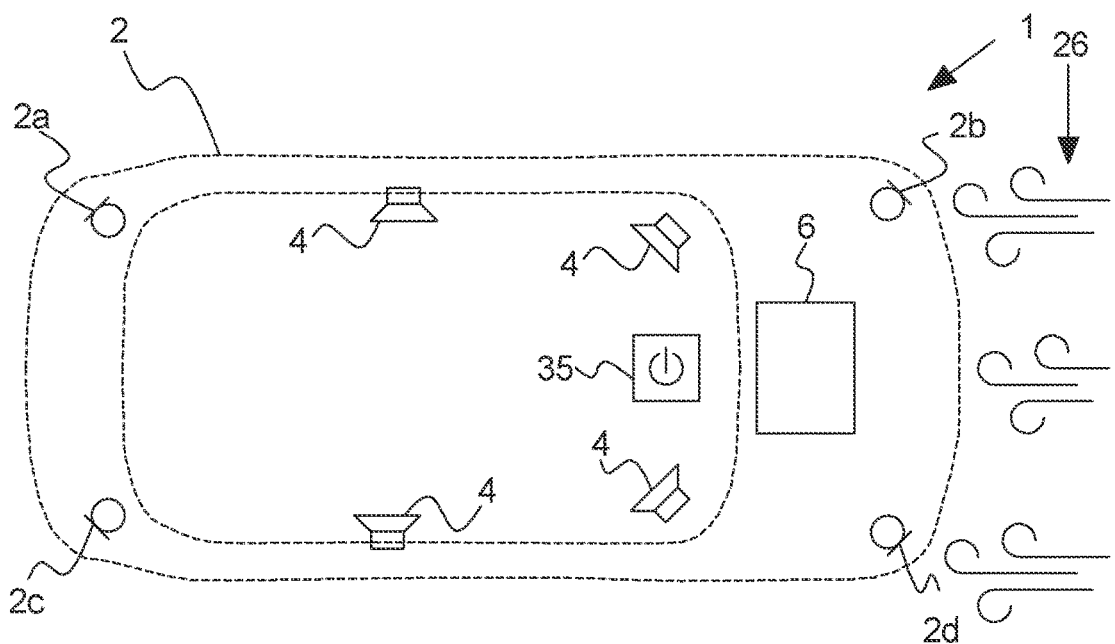
Figure 8B:
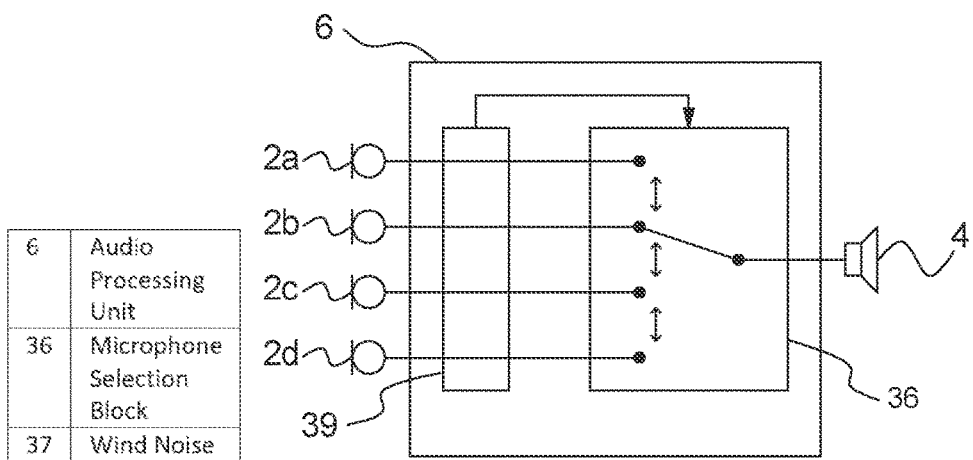
Figure 8C:
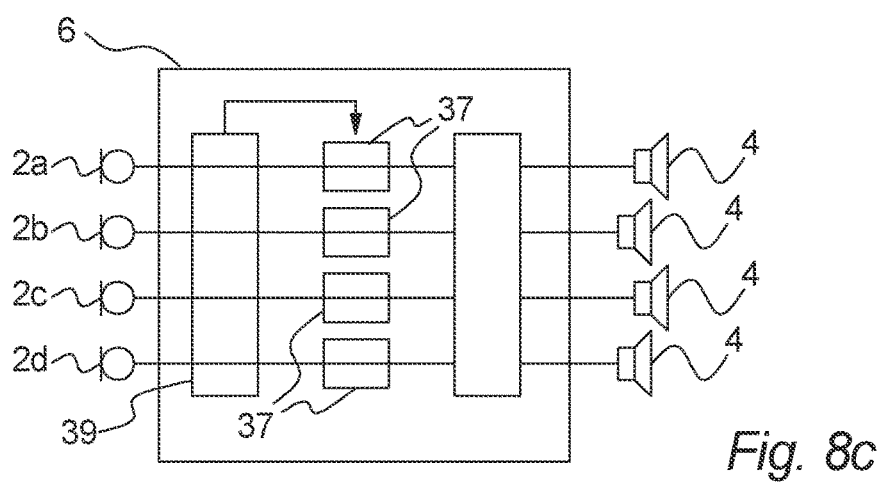

FIGS. 8*a-c* illustrate wind 26 and schematic processing for reduction of wind noise content according to embodiments of the invention.

FIG. 8*a* is a simple illustration of how an automobile 1 according to the invention may be exposed to winds 26 or drafts. Such winds/drafts may for example be due to the weather, due to movement of the automobile 1, or a combination.

Wind 26 may result in wind noise picked up by microphones. In the illustration, particularly two of the microphones 2*b*, 2*d* are largely exposed to wind 26, and will generate a large degree of wind noise content in their recorded audio signals, whereas the two remaining microphones 2*a*, 2*c* are minimally exposed to wind 26 and will generate a small degree of wind noise content.

Since reproduction of external sound is an aspect of the invention, treating/minimizing any wind noise content is advantageous. Such treating/minimizing of wind noise content may for example be performed via the audio processing unit 6 as illustrated in FIG. 8*b* and FIG. 8*c*, which provide different approaches.

In FIG. 8*b*, the audio processing unit 6 receives recoded audio signals recorded and established by the external microphones 2*a*, 2*b*, 2*c*, 2*d*. These signals are analyzed in a wind noise analysis block 39. Wind noise in audio signals may be characterized by a relatively large DC and/or low frequency component. Low frequencies may for example be below 100 Hz, below 50 Hz, or below 20 Hz.

The wind noise analysis block 39 is configured to identify wind noise content in the audio signals from the microphones 2*a*, 2*b*, 2*c*, 2*d*. In practice, this can be implemented by a comparison of the recordings from the microphones to identify one or more microphones with most or least DC/low-frequency content. For example, the integrated signal amplitude of content below 50 Hz is regularly calculated for each for the signals and are compared to identify which two microphones provide the most wind noise content, and which two microphones provide the least wind noise content.

After the wind noise analysis block 39, the signals are forwarded to a microphone selection block 36. Here, one or more microphones 2*a*, 2*b*, 2*c*, 2*d* are selected for reproduction of the external sound via internal loudspeakers 4. The selection is performed based on input from the wind noise analysis block. For example, the wind noise analysis block has determined that two microphones 2*b*, 2*d* have a relatively large amount of wind noise content, and that two other microphones 2*a*, 2*c* have a relatively small amount of wind noise content. Accordingly, reproduction of external sound, including, e.g., external sound based on directionality encoded audio signal, via internal loudspeakers 11 may be based only on the signals from the two microphones 2a, 2c with the relatively small amount of wind noise content.

Optionally, a relative directionality of an external sound source may be based on signals from all of the microphones, irrespective of the wind noise content in the recorded audio signals, whereas directionality encoding of an audio signal and reproduction of external sound in the vehicle on, for example, directionality encoded audio signals may be based on microphones with relatively small amount of wind noise context, e.g., the two microphones 2a, 2b in this particular example.

Optionally, determining a relative directionality may also be based on a subset of microphones with the least amount of wind noise, which may be especially advantageous when audio signals recorded by some microphones are contaminated by a particularly high amount of wind noise.

The selection block regularly/continuously selects which microphones(s)/recorded sound signals are forwarded to the loudspeaker(s).

In an alternative embodiment, the audio signals from each of the microphones are compared to an absolute DC or low-frequency threshold for wind noise content, to identify whether an audio signal has wind noise content or not. The reproduction of external sound, is then only based on microphones for which the audio signal analysis block has not identified wind noise content.

In the embodiment of FIG. 8c, the audio processing unit 6 again receives recoded sound signals recorded from the external microphones 2a, 2b, 2c, 2d. Again, these signals are analyzed in a wind noise analysis block 39 to identify wind noise content, for example as exemplified above. However, here each of the recorded sound signals are provided to individual wind noise filters 37. These filters 37 are individually dynamically reconfigured based on input from the wind noise analysis block 39, such that wind noise content is reduced when reproducing the external sound. A filter may for example be a high-pass filter, in which filter coefficients, such as cut-off frequency, attenuation, and filter order are dynamically adjusted. A filter may further comprise a bandpass filter, or an adaptive filter, which is configured such that, e.g., the frequency response of the filter is adapted according to the wind noise content.

Optionally, directionality encoding of recorded audio signals may be based on recorded audio signal that has been filtered by one or more wind noise filters.

The principles of this embodiment may also be applied in other contexts than for an automobile audio system. For example, headphones configured to perform active noise control, may have several microphones of which one is more exposed to wind than another microphone. Wind noise recorded by a microphone used for active noise control may be transmitted to the user of the headphones. By dynamically selecting which microphone(s) the active noise control is based on, wind noise heard by the user may be reduced, which is advantageous.

In the following, various embodiments of the invention are presented without reference to particular figures.

It should be understood that according to the invention, all described and exemplified embodiments may be combined to achieve further embodiments according to the invention.

Generally, automobiles according to the invention may comprise any of the automobile audio systems of the disclosure. Further, methods according to the invention may be facilitated by any automobile audio system or automobile of the disclosure. Similarly, automobiles or automobile audio systems according to the invention may facilitate any method of the disclosure.

In some embodiments of the invention, the sound directionality of the external sound is obtained via beamforming (as exemplified in FIG. 5) in combination with at least one established directionality encoding, as exemplified in FIG. 1 and/or FIG. 2, while in more advanced embodiments of the invention, establishing a directionality encoding of a recorded audio signal may further include aspects as exemplified in FIG. 3, such as, e.g., determining frequency dependent directionality filters based on estimated biometrics and further, e.g., producing ear-specific directionality encoded audio signals.

In some embodiments of the invention, the internal loudspeakers comprise internal loudspeaker pairs for directional reproduction of the external sound, and the automobile audio system is further configured for establishing at least one directionality encoded audio signal and/or the automobile audio system is configured to reduce wind noise content in recorded sound signals.

In other embodiments of the invention, reproduction of a representation of an external sound within a vehicle may be "turned on" and/or "turned off" automatically, whereas in other embodiments of the invention it may be "turned on" and/or "turned off manually," e.g., by operating the transmission switching mechanism 35. Some embodiments may comprise a transmission switching mechanism that enables three of the just mentioned options to be selected via the switch, e.g., the manual "turn on," the manual "turn off," and the automatic setting. The transmission switching mechanism may be combined with any embodiment according to the invention.

From the above, it is now clear that the invention relates to an automobile comprising an automobile audio system configured to record external sound, encode a directionality onto said external sound and then reproduce the external sound within an automobile such that an occupant within the automobile experience a directionality of that reproduced representation of external sound.

The invention has been exemplified above with the purpose of illustration rather than limitation with reference to specific examples of methods and embodiments. Details such as a specific method and system structures have been provided in order to understand embodiments of the invention. Detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

LIST OF REFERENCE SIGNS

1 Automobile
2 Microphone
3 Automobile exterior
4 External sound
5 Recorded audio signal
6 Audio processing unit
7 External sound source
8 Occupant
9 directionality encoded audio signal
10 frequency dependent directionality filter 11 internal loudspeaker
12 automobile interior
13 Representation of external sound
14 Audio signal analyzer
15 Relative directionality information signal
16 Head related transfer function determiner
17 Head related transfer function impulse response
18 Convolution engine
19 Directionality encoded audio signal
20 Audio input analog to digital converter
21 Biometrics information unit
22 Ear specific audio engine
23 audio output digital to analog converter
24 Ear adapted directionality encoded audio signal
25 Biometric information signal
26 Wind
27 Audio signal representation
28 Principal signal
29 Accommodating signal
30 Sound
31 Loudspeaker pair
32 Directional reproduction of sound
33 Loudspeaker propagation point
34 Sound propagation signal
35 Transmission switching mechanism
36 Microphone selection block
37 Wind noise filter
39 Wind noise analysis block
S1-S5 Method steps

The invention claimed is:

1. A method for reproducing an external sound in an automobile, said method comprising:
 recording an external sound using at least one of one or more external microphones located on an automobile exterior of said automobile;
 establishing one or more recorded audio signals based on the recorded external sound;
 determining from said one or more recorded audio signals a relative directionality of one or more external sound sources of said recorded external sound with respect to at least one occupant within said automobile;
 establishing at least one directionality encoded audio signal by applying at least one frequency dependent directionality filter to said one or more recorded audio signals, wherein said at least one frequency dependent directionality filter is based on said determined relative directionality of said one or more external sound sources, thereby encoding said relative directionality into said at least one directionality encoded audio signal; and
 reproducing a representation of said external sound based on said at least one directionality encoded audio signal using one or more internal loudspeakers located within an automobile interior of said automobile.

2. The method according to claim 1, wherein said determining said directionality of said one or more external sound sources is based on analyzing said one or more recorded audio signals.

3. The method according to claim 1, wherein said determining said directionality of said one or more external sound sources is based on analyzing at least two of said one or more recorded audio signals using beamforming processing.

4. The method according to claim 1, wherein said determining said directionality of said one or more external sound sources is based on one or more level differences between at least two of said one or more recorded audio signals.

5. The method according to claim 1, wherein said at least one frequency dependent directionality filter is based on an estimated location of said one or more internal loudspeakers.

6. The method according to claim 1, wherein said at least one frequency dependent directionality filter is based on an estimated location of said at least one occupant.

7. The method according to claim 1, wherein said at least one frequency dependent directionality filter is based on one or more estimated biometrics of said at least one occupant.

8. The method according to claim 7, wherein at least one estimated biometrics of said one or more estimated biometrics of said at least one occupant is determined based on imaging of said at least one occupant, using one or more from the list of: ultrasonic imaging, optical imaging, camera imaging, infrared camera imaging, and voice imaging.

9. The method according to claim 7, wherein said at least one frequency dependent directionality filter is based on at least one estimated head-related transfer function of said at least one occupant, and
 wherein said at least one estimated head-related transfer function is based on said determined relative directionality.

10. The method according to claim 9, wherein said at least one estimated head-related transfer function is determined for each of said at least one occupant to establish at least one occupant specific estimated head-related transfer functions for each of said at least one occupant, and
 wherein said at least one frequency dependent directionality filter is determined based on said at least one occupant specific estimated head-related transfer function.

11. The method according to claim 10, wherein said at least one occupant specific estimated head-related transfer functions is selected from a set of predefined estimated head-related transfer functions, and
 wherein said selection of said at least one occupant specific estimated head-related transfer functions is based on at least one of said one or more biometrics of said at least one occupant.

12. The method according to claim 9, wherein said at least one estimated head-related transfer function is selected from an array of predefined estimated head-related transfer functions,
 wherein said predefined estimated head-related transfer functions are determined for a number of different locations of said one or more external sound sources with respect to at least one generic occupant within said automobile, and
 wherein said generic occupant represents said at least one occupant within said automobile.

13. The method according to claim 1, wherein said at least one frequency dependent directionality filter is based on a set of estimated head-related transfer functions,
 wherein at least a first estimated head-related transfer function of said set of estimated head-related transfer functions is based on said relative directionality with respect to a first ear of said at least one occupant within said automobile, and
 wherein at least a second estimated head-related transfer function of said set of estimated head-related transfer functions is based on said relative directionality with respect to a second ear of said at least one occupant within said automobile.

14. The method according to claim 1, wherein said establishing said at least one directionality encoded audio signal comprises applying individual said at least one frequency dependent directionality filter thereby establishing individual said at least one directionality encoded audio signal.

15. The method according to claim 1, wherein said one or more internal loudspeakers comprises at least one loudspeaker array, and
wherein an audio processing unit is configured to reproduce said representation of said external sound via said at least one loudspeaker array based on beamforming.

16. The method according to claim 1, wherein said reproduction of said representation of said external sound is reproduced at individual levels via each said one or more internal loudspeakers.

17. The method according to claim 1, wherein at least two different directionality encoded audio signals are reproduced simultaneously using different subsets of said internal loudspeakers.

18. The method according to claim 1, further comprising:
analyzing said one or more recorded audio signals to identify wind noise content in said one or more recorded audio signals; and
filtering said one or more recorded audio signals to reduce said wind noise content,
wherein said establishing at least one directionality encoded audio signal is based on said at least one filtered audio signal.

19. An automobile audio system for an automobile, said automobile audio system comprising:
one or more external microphones configured to record external sound and establish one or more recorded audio signals;
an audio processing unit configured to determine a relative directionality of one or more external sound sources of said recorded external sound with respect to at least one occupant, and further configured to establish at least one directionality encoded audio signal by applying at least one frequency dependent directionality filter to said one or more recorded audio signals, wherein said at least one frequency dependent directionality filter is based on said determined relative directionality of said one or more external sound sources, thereby encoding said relative directionality into said at least one directionality encoded audio signal; and
one or more internal loudspeakers configured to reproduce a representation of said external sound based on said at least one directionality encoded audio signal.

20. An automobile comprising an automobile audio system, said automobile audio system comprising:
one or more external microphones located on an automobile exterior of said automobile and configured to record external sound and establish one or more recorded audio signals;
an audio processing unit configured to determine a relative directionality of one or more external sound sources of said recorded external sound with respect to at least one occupant within said automobile, and further configured to establish at least one directionality encoded audio signal by applying at least one frequency dependent directionality filter to said one or more recorded audio signals, wherein said at least one frequency dependent directionality filter is based on said determined relative directionality of said one or more external sound sources, thereby encoding said relative directionality into said at least one directionality encoded audio signal; and
one or more internal loudspeakers located within an automobile interior of said automobile and configured to reproduce a representation of said external sound based on said at least one directionality encoded audio signal.

* * * * *